(12) United States Patent
Woodman

(10) Patent No.: US 10,477,262 B2
(45) Date of Patent: Nov. 12, 2019

(54) BROADCAST MANAGEMENT SYSTEM

(71) Applicant: GoPro, Inc., San Mateo, CA (US)

(72) Inventor: Nicholas D. Woodman, Woodside, CA (US)

(73) Assignee: GoPro, Inc., San Mateo, CA (US)

( * ) Notice: Subject to any disclaimer, the term of this patent is extended or adjusted under 35 U.S.C. 154(b) by 120 days.

(21) Appl. No.: 15/698,858

(22) Filed: Sep. 8, 2017

(65) Prior Publication Data

US 2018/0014061 A1 Jan. 11, 2018

Related U.S. Application Data

(60) Continuation of application No. 14/830,318, filed on Aug. 19, 2015, now Pat. No. 9,794,615, which is a (Continued)

(51) Int. Cl.
*H04N 5/932* (2006.01)
*H04N 21/43* (2011.01)
(Continued)

(52) U.S. Cl.
CPC ......... *H04N 21/4307* (2013.01); *G11B 27/10* (2013.01); *H04N 5/765* (2013.01);
(Continued)

(58) Field of Classification Search
CPC ........... H04N 21/4307; H04N 21/8547; H04N 21/44008; H04N 21/4394; H04N 21/435;
(Continued)

(56) References Cited

U.S. PATENT DOCUMENTS 5,434,678 A 7/1995 Abecassis
5,991,373 A 11/1999 Pattison
(Continued)

FOREIGN PATENT DOCUMENTS

EP 1457989 A2 9/2004
GB 2231438 A 11/1990
(Continued)

OTHER PUBLICATIONS

PCT International Search Report and Written Opinion, PCT Application No. PCT/US2011/036116, dated Sep. 15, 2011, 20 pages.
(Continued)

*Primary Examiner* — Helen Shibru
(74) *Attorney, Agent, or Firm* — Young Basile Hanlon & MacFarlane, P.C.

(57) ABSTRACT

A broadcast management system creates, manages, and streams a broadcast of an event from videos captured from multiple cameras. A video capture system comprising multiple cameras captures videos of the event and transmits the videos to a broadcast management server. The broadcast management server generates a website or other graphical interface that simultaneously displays the captured videos in a time-synchronized manner. A broadcast manager user creates a broadcast by selecting which video to output to the broadcast at any given time. A broadcast map is stored for each broadcast that includes all of the broadcast decisions made by the broadcast manager user such that the broadcast can be recreated at a later time by applying the broadcast map to the raw videos. Using a viewer client, viewers can browse or search for broadcasts and select a broadcast for viewing.

20 Claims, 9 Drawing Sheets

Related U.S. Application Data division of application No. 14/072,319, filed on Nov. 5, 2013, now Pat. No. 9,142,257, which is a continuation of application No. 13/104,921, filed on May 10, 2011, now Pat. No. 8,606,073.

(60) Provisional application No. 61/334,055, filed on May 12, 2010.

(51) Int. Cl.
  *H04N 21/439* (2011.01)
  *H04N 21/44* (2011.01)
  *H04N 21/435* (2011.01)
  *H04N 21/8547* (2011.01)
  *H04N 5/765* (2006.01)
  *H04N 21/218* (2011.01)
  *H04N 21/2187* (2011.01)
  *H04N 21/242* (2011.01)
  *H04N 21/2743* (2011.01)
  *H04N 21/278* (2011.01)
  *H04N 21/482* (2011.01)
  *H04N 21/262* (2011.01)
  *G11B 27/10* (2006.01)
  *H04N 5/77* (2006.01)

(52) U.S. Cl.
  CPC ... *H04N 21/2187* (2013.01); *H04N 21/21805* (2013.01); *H04N 21/242* (2013.01); *H04N 21/26258* (2013.01); *H04N 21/278* (2013.01); *H04N 21/2743* (2013.01); *H04N 21/435* (2013.01); *H04N 21/4394* (2013.01); *H04N 21/44008* (2013.01); *H04N 21/4828* (2013.01); *H04N 21/8547* (2013.01); *H04N 5/77* (2013.01)

(58) Field of Classification Search
  CPC ............. H04N 21/26258; H04N 5/765; H04N 21/278; H04N 21/2743; H04N 21/242; H04N 21/2187; H04N 21/21805; H04N 21/4828; H04N 5/77; G11B 27/10
  USPC .................. 386/201, 207, 223–224
  See application file for complete search history.

(56) References Cited

U.S. PATENT DOCUMENTS

| | | | |
|---|---|---|---|
| 5,996,015 A | 11/1999 | Day | |
| 6,741,290 B1 | 5/2004 | Wells | |
| 6,985,191 B2 | 1/2006 | Choi | |
| 7,017,120 B2 | 3/2006 | Shnier | |
| 7,024,677 B1 | 4/2006 | Snyder | |
| 7,551,200 B2 | 6/2009 | Okada | |
| 8,311,983 B2* | 11/2012 | Guzik | G11B 27/034 340/539.13 |
| 8,515,338 B2 | 8/2013 | Cohen | |
| 9,142,257 B2 | 9/2015 | Woodman | |
| 2002/0069419 A1 | 6/2002 | Raverdy | |
| 2003/0156826 A1 | 8/2003 | Sonoda | |
| 2003/0204630 A1 | 10/2003 | Ng | |
| 2004/0111750 A1 | 6/2004 | Stuckman | |
| 2004/0113933 A1* | 6/2004 | Guler | G06K 9/00771 715/716 |
| 2005/0022235 A1 | 1/2005 | Davis | |
| 2005/0278618 A1 | 12/2005 | Ogikubo | |
| 2006/0184980 A1 | 8/2006 | Cole | |
| 2007/0019931 A1 | 1/2007 | Sirbu | |
| 2007/0065100 A1 | 3/2007 | Matsuda | |
| 2007/0182864 A1 | 8/2007 | Stoneham | |
| 2008/0005323 A1 | 1/2008 | Shinkai | |
| 2008/0172243 A1 | 7/2008 | Kelly | |
| 2008/0178232 A1 | 7/2008 | Velusamy | |
| 2009/0164600 A1 | 6/2009 | Issa | |
| 2009/0180750 A1 | 7/2009 | Sheedy | |
| 2009/0249404 A1 | 10/2009 | Chen | |
| 2009/0327100 A1 | 12/2009 | Greenberg | |
| 2009/0328096 A1 | 12/2009 | Krause | |
| 2010/0023987 A1 | 1/2010 | Bugenhagen | |
| 2010/0088159 A1 | 4/2010 | Henshaw | |
| 2010/0128183 A1 | 5/2010 | Ishii | |
| 2010/0199318 A1 | 8/2010 | Chang | |
| 2011/0119565 A1 | 5/2011 | Chang | |
| 2013/0148022 A1 | 6/2013 | Dipankumar | |
| 2017/0105042 A1* | 4/2017 | Toma | H04N 5/765 |
| 2018/0376178 A1* | 12/2018 | Cormican | H04N 5/44543 |

FOREIGN PATENT DOCUMENTS

| | | |
|---|---|---|
| WO | 03079220 A1 | 9/2003 |
| WO | 2008151416 A1 | 12/2008 |

OTHER PUBLICATIONS

Broadcast Pix, "The Switcher Redefined," Slate is an entire Control Room, Apr. 30, 2007, 16 Pages.

Supplementary Partial European Search Report for European Patent Application No. EP 11781225, dated Mar. 3, 2014, 14 Pages.

Non-Final Office Action for U.S. Appl. No. 13/104,921, dated Nov. 7, 2012, 16 Pages.

Communication pursuant to Article 94(3) EPC for European Patent Application No. EP 11781225, dated Mar. 11, 2015, 8 pages.

Summons to Attend Oral Proceedings Pursuant to Rule 115(1) EPC for European Patent Application No. EP11781225.5, dated Nov. 9, 2015, 7 Pages.

* cited by examiner

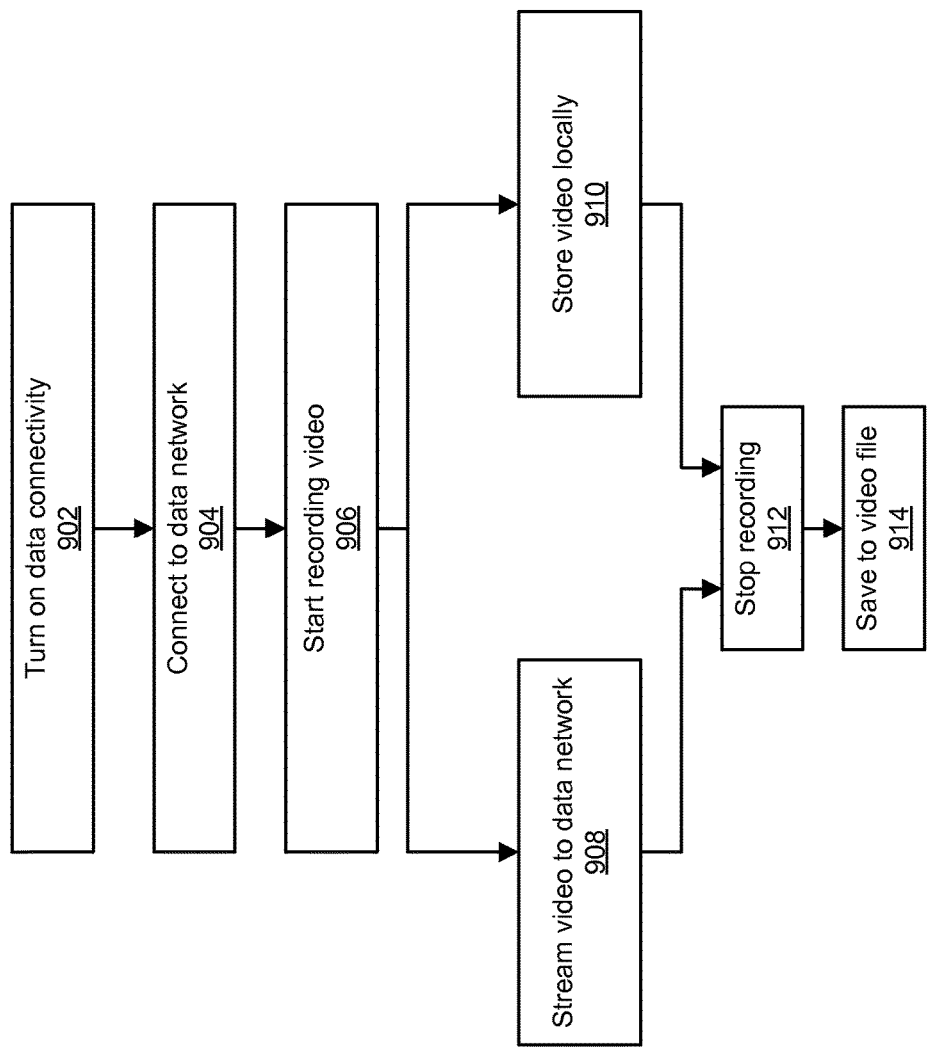

BROADCAST MANAGEMENT SYSTEM

CROSS-REFERENCE TO RELATED APPLICATION(S)

This application is a continuation of U.S. patent application Ser. No. 14/830,318, filed Aug. 19, 2015, now U.S. Pat. No. 9,794,615, issued on Oct. 17, 2017, which is a divisional of U.S. patent application Ser. No. 14/072,319, filed Nov. 5, 2013, now U.S. Pat. No. 9,142,257, issued on Sep. 22, 2015, which is a continuation of U.S. patent application Ser. No. 13/104,921, filed on May 10, 2011, now U.S. Pat. No. 8,606,073, issued on Dec. 10, 2013, which claims priority to U.S. Provisional Application Ser. No. 61/334,055, filed May 12, 2010, the entire disclosures of which are hereby incorporated by reference.

BACKGROUND

1. Technical Field

This disclosure relates to a broadcast management system, and more specifically, to an application for creating customized broadcasts from multiple video streams.

2. Description of the Related Arts

In recent years, the creation and distribution of digital videos has become increasingly popular. Improvements in digital camera technology has made high quality video cameras both affordable and easy to operate. Video editing software provides convenient tools for editing video files or stitching together multiple video files. Furthermore, numerous video sharing websites allow users to easily share video content with any number of viewers.

Despite these advances in video technology, conventional systems are not well-suited for creating and sharing amateur broadcasts of live events such as sports or concerts. These events are ideally captured using multiple video cameras recording simultaneously. For example, at sports events cameras are commonly placed at different locations around a playing field or arena. Different cameras may focus on different portions of the playing field, follow different players or participants, or capture the event from various angles. Although some video sharing websites allow users to stream a video in real-time, conventional solutions do not provide tools for real-time control, editing, and management of multiple video streams.

In professional broadcast systems, multiple camera feeds are fed to a director's room and displayed on panels of monitors. A broadcast director simultaneously views all of the different camera feeds, and at any given time, selects a feed for broadcasting. However, these professional broadcast systems are extremely expensive and rely on dozens of trained employees working concurrently to manage the broadcast. Thus, these broadcast systems are feasible only for large network or cable broadcasting corporations and are not compatible with the needs of an amateur broadcaster.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. 9 is a flowchart illustrating an embodiment of a process for operating a video capture system.

DETAILED DESCRIPTION

Figure 1:
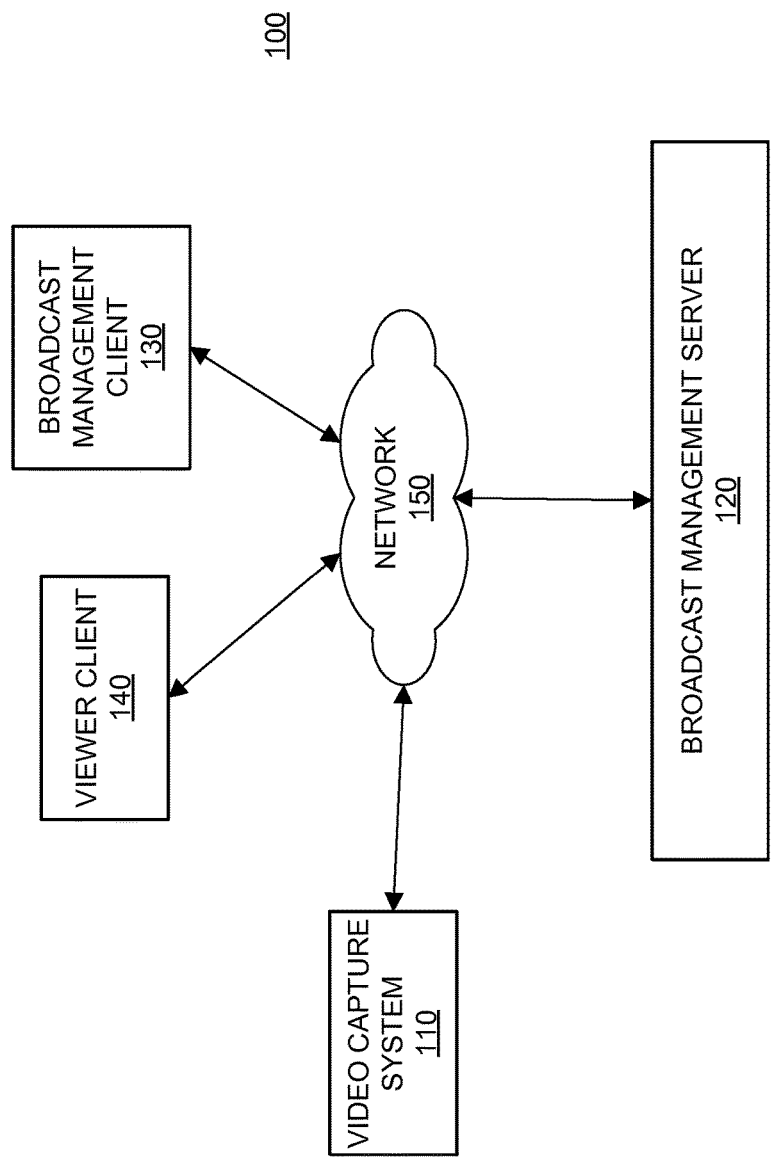
FIG. 1 is a block diagram illustrating an embodiment of a broadcast management system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A broadcast management system (and method) provides broadcasters, professional and amateur, a configuration for creating, managing, and streaming broadcasts from multiple cameras. The cameras are consumer grade and the system configuration allows for an inexpensive production configuration without the expense of professional grade equipment.

The broadcast management system could be used to produce low-cost broadcasts of local events (or activities), including sporting events, theater performances, concerts, weddings, or other events that are not typically covered by professional broadcast companies. Examples of such local events include grade school or high school events, and performances, family gatherings, recreational activities, and business organization activities. In one example embodiment, live broadcasts can be created and streamed to any number of viewers in real-time as the event is happening, such as a high school basketball game or football game or a grade school recital concert. In another example embodiment, users can create broadcasts from previously stored video files, such as a wedding, an anniversary party, a birthday celebration, or business team building event.

In one example embodiment of a broadcast management system and method, a broadcast management system receives a plurality of videos comprising at least a first video and a second video. The broadcast management system generates a broadcast management interface comprising a first stream window for playing the first video and a second stream window for playing the second video concurrently with the first video. The first and second videos are played in synchronization with respect to a universal clock. Responsive to receiving a selection of the first stream window while the first video is playing, the broadcast management system streams the first video to a broadcast viewer client. Responsive to receiving a selection of the second stream window while the second video is playing, the broadcast management system streams the second video stream to the broadcast viewer client.

In one embodiment, the broadcast is created from previously received video files. The received first and second video files include timestamps representative of capture start times of the first and second video files relative to the universal clock. The broadcast management system determines replay start times for the first and second video files according to the timestamps such that relative timing of the replay start times matches relative timing of the capture start times.

In one embodiment, a computer-readable storage medium stores computer-executable program instructions for executing the method of the broadcast management system described above.

Unlike professional broadcast systems, users can create high quality broadcasts using low cost digital cameras and a user-friendly broadcast management application. Advantageously, the broadcast management system is well-suited for amateur broadcasters without requiring the personnel, resources, or budgets of traditional professional broadcast systems.

System Architecture

A broadcast management system 100 allows a user to produce a broadcast of an event captured from multiple time-synchronized video cameras. FIG. 1 is a high level block diagram of the broadcast management system 100 according to one embodiment. FIG. 1 illustrates a video capture system 110, a broadcast management server 120, a broadcast management client 130, and a viewer client 140, all connected by a network 150. Only one video capture system 110, broadcast management server 120, broadcast management client 130, and viewer client 140 are shown in FIG. 1 in order to simplify and clarify the description. However, embodiments of the broadcast management system 100 can have thousands or millions of clients 130, 140, as well as multiple broadcast management servers 120 and video capture systems 110.

The video capture system 110 captures videos and provides the captured videos to the broadcast management server 120. In a typical broadcast situation, the video capture system 110 comprises two or more cameras positioned at different locations to simultaneously capture video footage of an event. For example, at a sporting event, the video capture system 110 may comprise two ore more cameras positioned at different locations around a playing field to capture the action from multiple angles. Furthermore, different cameras may be used to focus on different portions of the playing field. Additional cameras may be mounted on helmets or bodies of the participating athletes. Other cameras may be used to capture additional relevant footage in areas around the playing field such as, for example, the sidelines or the crowd. An example embodiment of a video capture system 110 is described in more detail below with respect to FIG. 3. Although the examples noted are in the context of sporting events, they may be applied to other settings where multiple cameras may be present, for example, theatrical productions, concerts, and educational seminars.

The broadcast management server 120 provides broadcast management tools that allow a user (e.g., a broadcast manager) to create and manage a video broadcast using the videos captured by the video capture system 110. In one embodiment, the broadcast management server 120 hosts a broadcast management website accessible using a broadcast management client 130 or viewer client 140. The broadcast management server 120 receives captured videos from the video capture system 110 via the network 150, generates a broadcast according to instructions provided by the broadcast manager user via the broadcast management client 130, and serves the broadcast to a viewer client 140. An example embodiment of a broadcast management server 120 is described in more detail below with respect to FIG. 4.

The broadcast management client 130 comprises a computer or other electronic device operated by a broadcast manager user to create and control broadcasts using the broadcast management server 120. For example, in one embodiment, the broadcast management client 130 comprises a personal computer executing a web browser that can access a broadcast management website hosted by the broadcast management server 120. In other embodiments, the broadcast management client 130 is an electronic device other than a personal computer, such as a personal digital assistant (PDA), a smartphone, a mobile telephone, a tablet computer, a television "set-top box," or the like. After accessing the broadcast management server 120, a broadcast manager user can use the tools provided by the broadcast management server 120 to create, view, and manage video broadcasts.

The viewer client 140 is a computer or other electronic device used by one or more users to view broadcasts generated and served by the broadcast management server 120. Like the broadcast management client 130, the viewer client 140 can comprise a personal computer executing a web browser or another electronic device. A user (e.g., viewer) can access the broadcast management server 120 using the viewer client 140, and use the available tools to browse and/or search for available broadcasts, and view a selected broadcast. Although illustrated separately for the purpose of clarity of description, a single client device is typically capable of acting as either a viewer client 140 or a broadcast management client 130. In one embodiment, the viewer client 140 comprises a display at the event being broadcasted (e.g., a scoreboard or big screen) that is coupled to the broadcast management client 130. For example, the broadcast management system 100 could be used to display real-time action or replays of action at a sports event on big screen or scoreboard.

The network 150 enables communications among the entities connected to it. In one embodiment, the network 150 is the Internet and uses standard communications technologies and/or protocols. Thus, the network 150 can include links using technologies such as Ethernet, 802.11, world-wide interoperability for microwave access (WiMAX), long term evolution (LTE), 3G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

At least a portion of the network 150 can comprise a mobile (e.g., cellular or wireless) data network such as those provided by wireless carriers, for example, VERIZON, AT&T, T-MOBILE, SPRINT, O2, VODAPHONE, and other wireless carriers. In some embodiments, the network 150 comprises a combination of communication technologies. For example, in one embodiment, communication between the video capture system 110 and the video server 120 occurs over a cellular data network, while communication between the video server 120 and the clients 130, 140 occurs over the Internet using an internet protocol. In another embodiment, the viewer client 140 comprises a television, and the broadcast management client 130 communicates with the client 140 using cable, satellite, or over-the-air television protocols.

In alternative embodiments of the broadcast management system 100, two or more of the entities can be directly coupled by means other than the network 150. For example, in one alternative embodiment, the video capture system 110 is coupled directly to the broadcast management server 120. In another alternative embodiment, the broadcast management client 130 and broadcast management server 120 comprises a single machine. In this embodiment, a broadcast manager user manages a broadcast using tools provided by a locally executing application rather than a web-based application or website.

Figure 2:
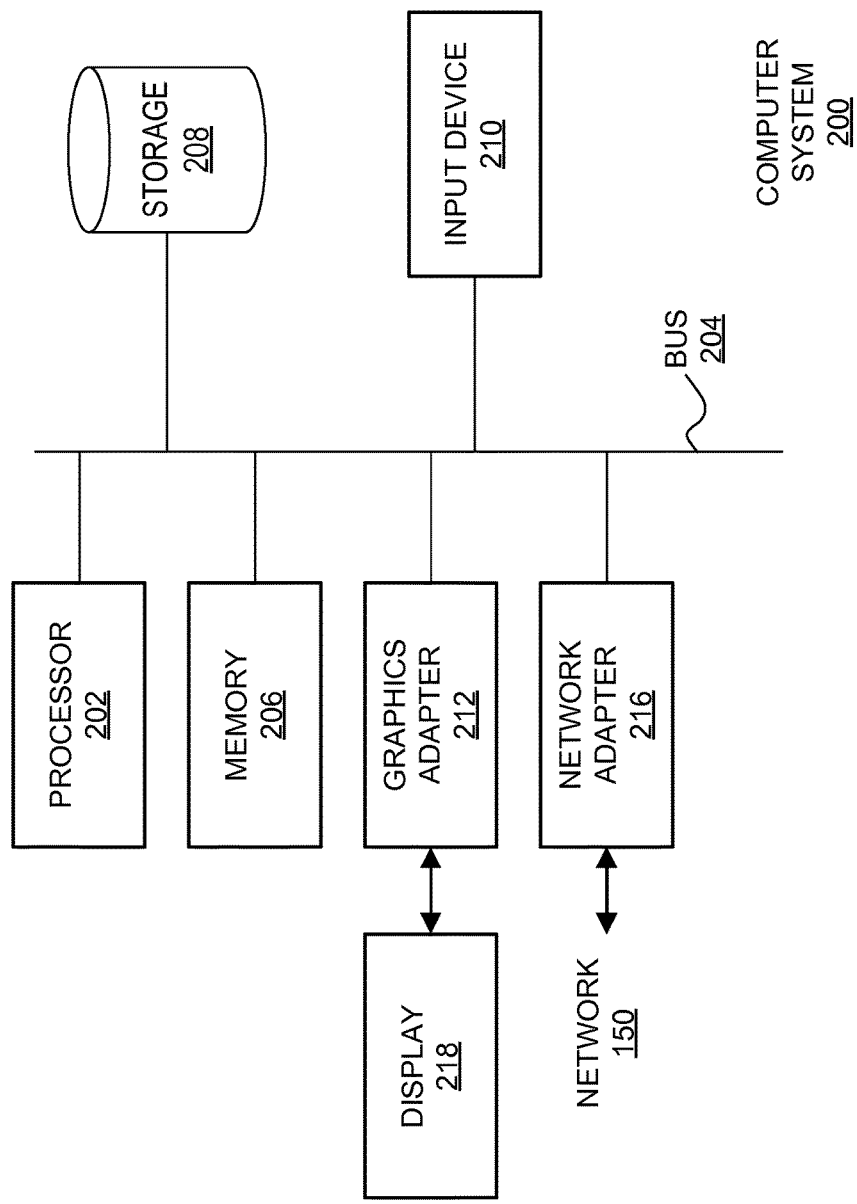
FIG. 2 is a block diagram illustrating an embodiment of a computer system.

Turning now to FIG. 2, it is a high-level block diagram illustrating a typical computer 200 for use as a broadcast management server 120, broadcast management client 130, and/or viewer client 140. Illustrated are a processor 202 coupled to a data bus 204. Also coupled to the bus 204 are a memory 206, a storage device 208, an input device 210 (e.g., a keyboard and/or a mouse), a graphics adapter 212, and a network adapter 216. A display 218 is coupled to the graphics adapter 212.

The processor 202 may be any general-purpose processor. The processor 202 is configurable to execute instructions, for example, instructions corresponding to the processes described herein. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM. The storage device 208 and/or the memory 206 are configured to store instructions and data that can be executed by the processor 202. The input device 214 may be a keyboard, a mouse, track ball, or other type of pointing device, or a combination of devices used to input data into the computer 200. The graphics adapter 212 displays images and other information on the display 218. The network adapter 216 couples the computer 200 to the network 202.

As is known in the art, the computer 200 is adapted to execute computer program modules. As used herein, the term "module" refers to computer-readable program instructions and/or data for providing the specified functionality. A module can be implemented in hardware, firmware, and/or software. In one embodiment, the modules are stored on the storage device 208, loaded into the memory 206, and executed by the processor 202.

The computer system 200 is an example structure used for the devices illustrated in FIG. 1. However, it is noted that the types of computer systems 200 utilized by the entities of FIG. 1 may vary depending upon the embodiment and the processing power utilized by the entity. For example, a viewer client 140 that is a mobile telephone typically has a processor that may have limited processing power and a smaller display 218. In contrast, a computer system 200 used as the broadcast management server 120 might have a processor with relatively greater processing power, but may lack a graphics adapter 212, display 218, and input device 210.

Figure 3:
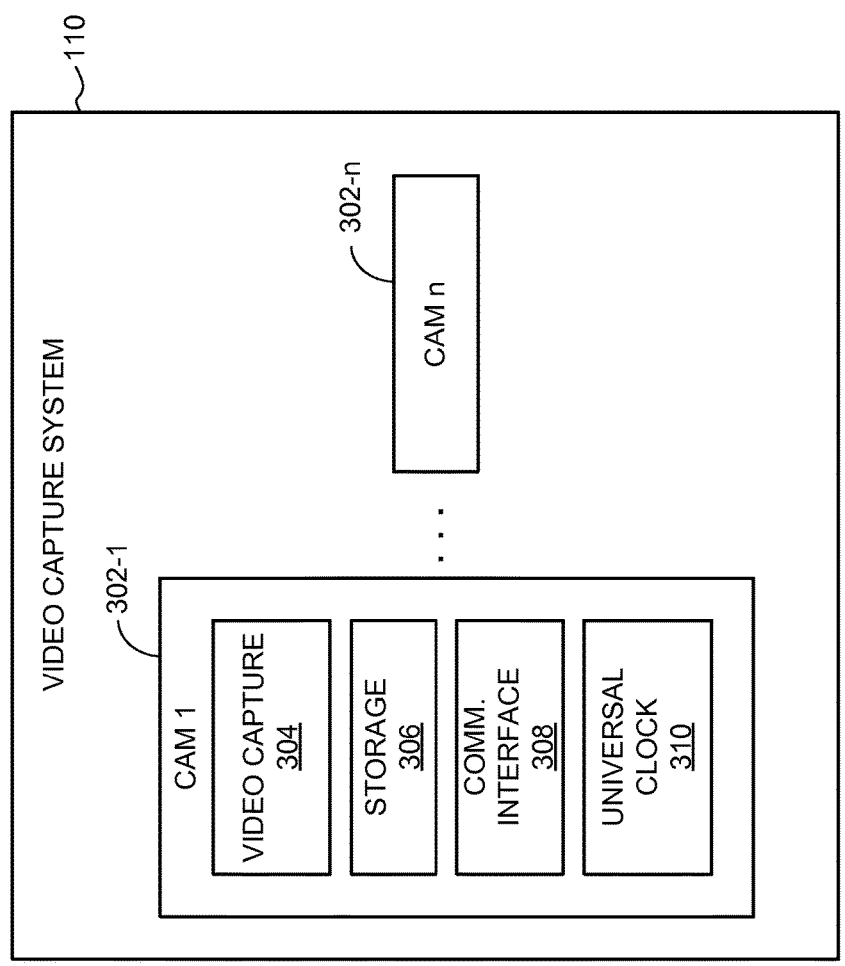
FIG. 3 is a block diagram illustrating an embodiment of a video capture system.

Referring now to FIG. 3, it is a block diagram illustrating an example embodiment of a video capture system 110. The video capture system 110 comprises one or more cameras 302-1 . . . 302-n (collectively referenced herein as cameras 302). Each camera 302 comprises a video capture unit 304, a storage 306, a communications interface 308, and a universal clock 310. The video capture unit 304 comprises components for capturing and processing video such as a lens, optical components, an image processor, and other conventional camera elements. The storage 306 is storage devices similar to storage device 208. The storage device 306 stores the captured video data, metadata associated with video files, and/or other data used by the video capture system 110. In various embodiments, the storage 306 can comprise internal camera memory, a removable memory card, an external storage unit, or a combination of storage mediums.

The communications interface 308 transmits the captured video to the broadcast management server 120 via the network 150. In one embodiment, the communications interface 308 operates over a wireless protocol such as, for example, WiFi, WiMax, 3G/4G, and so on. Alternatively, the communications interface 308 can be configured to directly transfer video to the broadcast management server 120 using a wired interface such as, for example, a Universal Serial Bus (USB). In various embodiments, the communications interface 308 can be configured to stream captured video to the network 150 as it is being recorded (e.g., live streaming), or can transmit video at a later time after recording and storing a complete video file. In various embodiments, the communications interface 308 can be integrated with the camera body, or can be part of a removable expansion module that plugs into an existing camera. An example of a camera configuration with a removable expansion module is described in more detail in U.S. patent application Ser. No. 12/498,890 to Nicholas D. Woodman filed Jul. 7, 2009 entitled "Camera Housing with Integrated Expansion Module," the contents of which is incorporated by reference herein.

The universal clock 310 maintains a universal time that can be read by the camera 302 to maintain time synchronization between captured videos. For example, the universal clock 310 may track a time standard such as Coordinated Universal Time (UTC). To compensate for potential drift between clocks 310 of the different cameras 302, the clocks 310 can periodically re-synchronize to the time standard. This synchronization can occur, for example, via the network 150 at periodic intervals, or when the camera 302 is plugged into to a web-enabled computing device. In one embodiment, the camera 302 checks the universal clock 310 at predefined time intervals whenever it starts recording video. A timestamp indicating the capture start time is stored together with each recorded video file. The timestamp may correspond to a particular 24-hour clock start time, e.g., 4:32 pm, which can be further synchronized with another clock, such as a mobile phone tower clock, a GPS clock, or an atomic clock, for greater accuracy.

In an alternative embodiment, the universal clock can be an elapsed time from a particular event, such as, for example, the time the first camera in the video capture system 110 starts recording (i.e. the start of the broadcast). For example, a first camera of the video capture system 110 starts recording and a timestamp 0:00:00 (hh:mm:ss) is stored as a capture start time together with the first recorded video. A second camera starts recording 1 minute and 42 seconds later and a timestamp 0:01:42 is stored as a capture start time together with the second recorded video, indicating the elapsed time since the start of the broadcast. Other variations are also possible, but in each case, the universal clock 310 tracks and stores timing information such that the capture start times between the different cameras 300 of the video capture system 110 can be determined when the videos are transferred to the broadcast management server 120. In embodiments where the broadcast management system 100 is only used for live streaming, the universal clock 310 may be absent from the video capture system 110.

Figure 4:
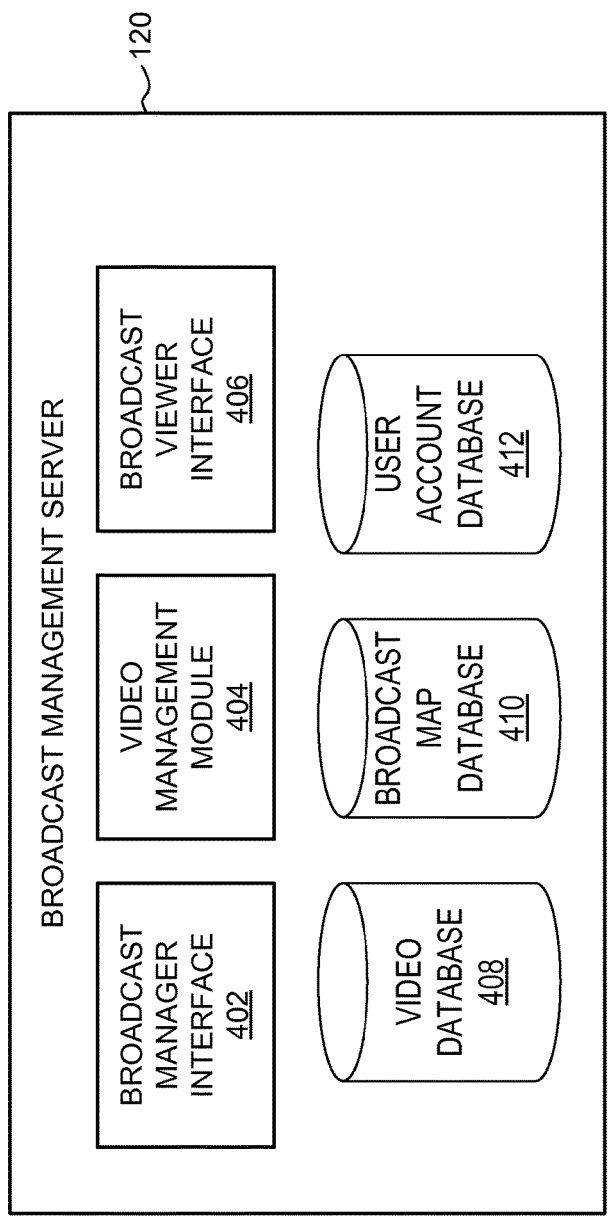
FIG. 4 is a block diagram illustrating an embodiment of a broadcast management server.

Next, FIG. 4 is a block diagram illustrating an example embodiment of the broadcast management server 120. The broadcast management server 120 comprises a broadcast manager interface module 402, a video management module 304, a broadcast viewer interface module 406, a video database 408, a broadcast map database 410, and a user account database 412. The components of the broadcast management server 120 are illustrated as functional modules for the purpose of clarity and convenience. In practice, the functional modules can be implemented in hardware, software, firmware, or a combination of these elements. For example, in one embodiment, the broadcast management server 120 comprises one or more computer readable-storage mediums (e.g., storage 208) that stores computer-executable program code for carrying out the functions of the broadcast management server 120. In operation, the program instructions are loaded from memory 206 and executed by a processor 202 to carry out the described functions.

The video database 408 stores video received from the video capture system 110. Optionally, the video database 408 also stores broadcasts generated using the broadcast management system 100. In one embodiment, video files in the video database 408 are stored in a storage, e.g., storage 208, and indexed such that the video database 408 can be queried to find and retrieve videos. For example, videos may be indexed by author, event associated with the video, time, camera used, or other video characteristics.

The broadcast map database 410 stores "broadcast maps" for broadcasts created using the broadcast management system 100. A broadcast map comprises a file that stores a sequence of instructions indicative of the timing of transitions between the different video files that are combined to create the broadcast. The broadcast map provides all the information needed to re-create a broadcast from a set of raw (or unedited) video files. Advantageously, if multiple broadcasts are created for the same event (using the same set of raw video files), the broadcast management server 120 need only store (e.g., in storage 208) a new broadcast map for each broadcast instead of storing the entire broadcast video file. Examples of broadcast maps are described in further detail below.

The user account database 412 stores account information for users of the broadcast management system 100. Account information can include, for example, a user profile, references to videos uploaded by the user, broadcasts created by the user, customized user settings, or other information associated with a particular user of the broadcast management system 100. Typically, a broadcast manager user signs into his/her user account in the broadcast management system 100 prior to creating a broadcast. Viewers may also utilize a user account, for example, to customize search results or viewing preferences. In other embodiments, viewers can view public broadcasts without logging into any personal user account.

The broadcast manager interface module 402 provides tools that allow a broadcast manager user to create a broadcast using the broadcast management system 100. For example, in one embodiment, the broadcast manager interface module 402 provides a web-based graphical interface (e.g., a website or web-based application) accessible by a web browser on the broadcast management client 130. The broadcast manager interface module 402 allows a user to generate broadcasts from live streaming videos or videos in the video database 408, manage or edit previously created broadcasts, or manage other information associated with the user's account. An example of a user interface provided by the broadcast manager interface module 402 is illustrated and described below with respect to FIG. 5.

The broadcast viewer interface module 406 provides tools that allow a user to find and view broadcasts using the broadcast management system 100. For example, in one embodiment, the broadcast viewer interface module 406 provides a web-based graphical interface accessible by a web browser on the viewer client 140. A user can search for broadcasts using, for example, a keyword search. Alternatively, the user can browse through all available broadcasts. Once a broadcast is selected for viewing, the broadcast viewer interface module 406 streams the video using, for example, an embedded video player, a pop-up video player, or other video viewing application viewable on the viewer client 140.

The video management module 404 manages incoming videos and outgoing video broadcasts. For example, the video management module 404 interfaces with the video capture system 110 to receive raw videos and store the videos to the video database 408. Furthermore, the video management module 404 interfaces with the broadcast manager interface module 402 to enable a broadcast manager user to create broadcasts from the raw videos, and provides the broadcasts to the broadcast viewer interface module 406 to stream to the client viewer 140. In one embodiment, the video management module 404 creates a broadcast map for each broadcast based on input provided by the broadcast management client 130.

Figure 5:
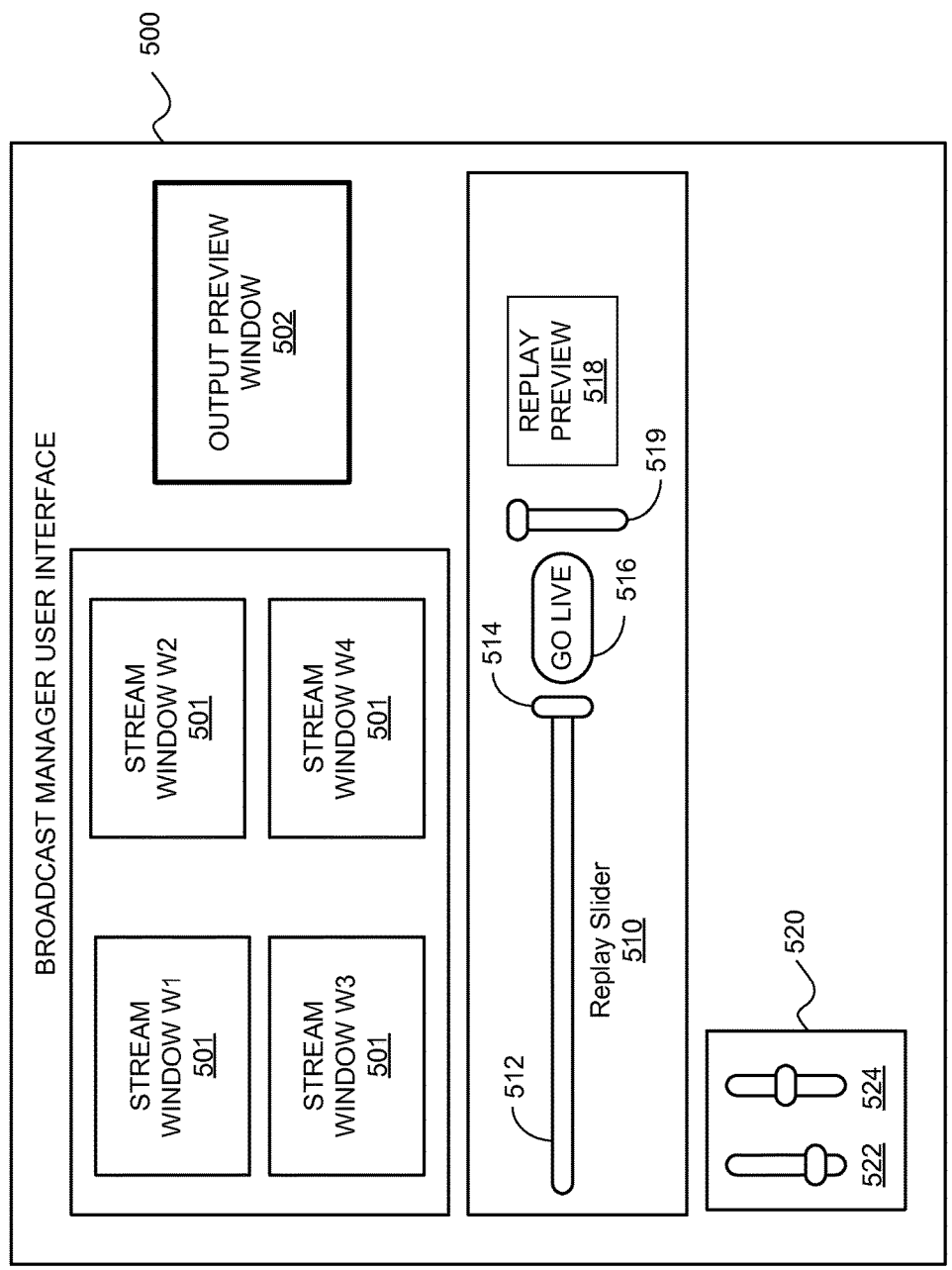
FIG. 5 illustrates an embodiment of a graphical user interface for managing broadcasts using the broadcast management system.

FIG. 5 is an example embodiment of a broadcast manager user interface 500 generated by the broadcast manager interface module 402. The broadcast manager user interface 500 is, for example, a website, web-based application, or locally executed application that provides tools and controls for creating and streaming a video broadcast. In the example user interface 500, a broadcast is created from four video streams of an event, typically corresponding to four different cameras. In different variations, any number of video streams can be included in the broadcast manager user interface 500.

The broadcast manager user interface 500 includes multiple stream windows 501, each displaying a different video stream (e.g., stream windows W1, W2, W3, and W4). Each video stream window 501 is synchronized in time, i.e., the various viewed streams displayed in each stream window 501 are played with the same relative timing as the videos were captured. A user can create a video broadcast by simultaneously viewing the multiple video streams as they are playing, and at any given time, selecting one of the video stream windows to broadcast. This feature allows the broadcast manager user to switch between the different cameras used to capture the event to create cuts from one camera to another in the broadcast. In one embodiment, the display includes an output preview window 502 that shows the currently selected stream window 501. Thus, the video in the preview window 502 lets the broadcast manager user view the actual broadcast as it is being created.

In one embodiment, the broadcast manager user interface 500 includes a replay slider 510 for generating replays in the broadcast. The replay slider 510 comprises a timeline 512 and a sliding bar 514. The timeline 512 represents a spectrum of time of the broadcast. For example, in one embodiment, the right end of the timeline 512 represents the current time (e.g., live time), and the left end of the timeline 512 represents the beginning of the broadcast. Alternatively, the left end of the timeline 512 can represent some fixed amount of time prior to the current time. For example, the timeline may represent the past 5 or 10 minutes of the broadcast. Generally, when no replay is being broadcasted, the sliding bar 514 is positioned on the right end of the timeline 512 indicating that the broadcast is live.

To invoke a replay, the broadcast manager user can slide the sliding bar 514 backwards on the timeline 512 to a desired point in time. The replay preview window 518 replays the broadcast beginning at the selected point in time. The broadcast manager user can use the preview window 518 to find the point in time for the desired replay prior to actually outputting the replayed video to the broadcast. When the broadcast manager user finds the right point in time, he/she can select the replay preview window 518 to output the replay to the broadcast. In one embodiment, a slow motion slider 519 can be used to create a slow motion replay. For example, the replay is played at full speed when the slider 519 is all the way up, and the replay speed decreases as the broadcast manager user slides the slider 519 lower. When the desired replayed portion is over, the broadcast manager user can return to live broadcasting by selecting the "Go Live" button 516, or alternatively, sliding the sliding 514 back to the right end of the timeline 512.

In one embodiment, the broadcast manager user interface 500 allows the broadcast manager user to add voiceover audio to the video broadcast using, for example, a microphone coupled to the broadcast management client 130. The voiceover audio is streamed in real-time to the client viewer 140 together with the broadcast video. In this embodiment, the broadcast manager user interface 500 can include volume controls tools 520. For example, the volume controls tools 520 can comprise a first volume slider 522 to control the volume level of the currently selected video stream window 501 and a second volume slider 524 to control volume of the voiceover audio.

Other embodiments of the broadcast manager user interface 500 can include different or additional tools and features for creating and managing a broadcast. For example, the interface 500 can provide additional tools similar to those found in traditional video editing software such as tools for controlling video contrast, brightness, color, etc. Additionally, the broadcast manager user interface 500 can provide tools to manage the user's account settings and/or place restrictions on who can view the broadcast. For example, the broadcast manager user can make the broadcast public to anyone who wants to view it, or can restrict viewing to subscribers only. In another embodiment, the broadcast manager user can choose to only store the broadcast to a file and make it available at a later time, rather than stream it live to viewer clients 140.

The example provided above illustrates that a broadcast can be configured to be live, therefore manipulating the streams in real time (or "on the fly") or may be configured for storage for subsequent manipulation of the streams to create a broadcast. Further, it may be configured to be a combination thereof, e.g., broadcast live with manipulation of streams in real time, but later broadcast using a different combination of saved video streams. In this latter example, an event viewed live from a first set of camera views can be experienced later from a second (or different) set of camera views, thereby giving a different perspective (or vantage point) of an event.

Operational Configurations

Figure 6:
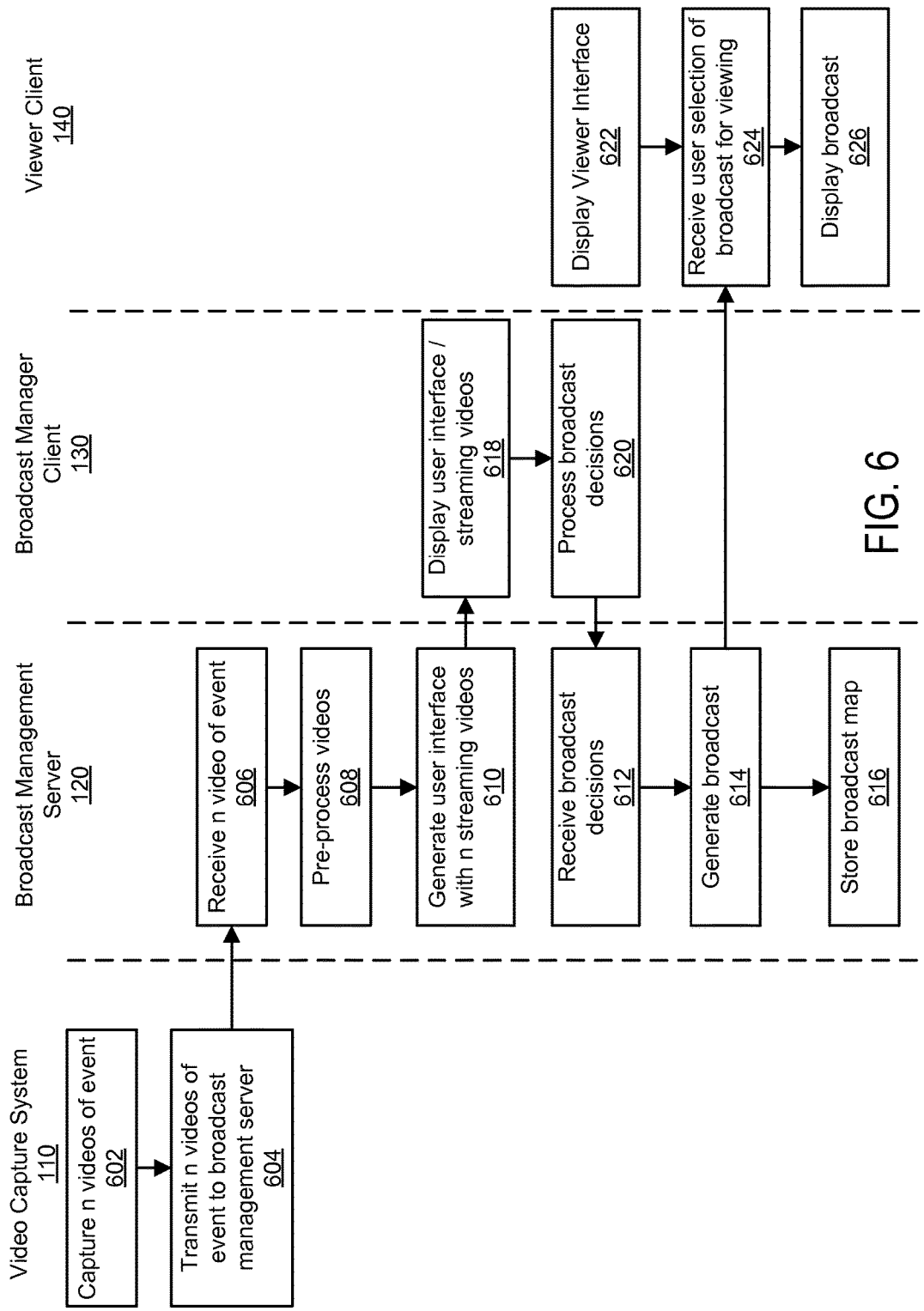
FIG. 6 is a flowchart illustrating an embodiment of a process for managing a broadcast using the broadcast management system.

Turning now to FIG. 6, it illustrates a flowchart of one embodiment of a process for producing a broadcast of an event using the broadcast management system 100. The video capture system 110 captures 602 video content of an event for broadcasting. In one embodiment, the captured video content comprises a set of n videos of the event (e.g., n comprising an integer value). Typically, each video comprising footage of a different aspect of the event or footage from a different location or camera angle. In one embodiment, each video file includes a timestamp indicating the capture start time of the video with respect to a universal clock, and an identifier identifying the specific camera on which the video was captured. The timestamp and identifier can be encoded as metadata associated with the video file, or can be encoded directly into the video file. For example, the information can be displayed in text on an initial frame of the video.

The video capture system 110 transmits 604 the n captured videos of the event to the broadcast management server 120. In one embodiment, the captured videos are streamed to the broadcast management server 120 as the videos are being captured, e.g., in real-time or with a brief delay. Alternatively, video can be captured and stored locally (e.g., in storage 306), and transferred to the broadcast management server 120 at a later time. For example, a user could transfer video files from storage 306 to a networked computing device, and then upload the video files to the broadcast management server 120 over the network 150. In one embodiment, the video capture system 110 utilizes a video buffer to ensure that no data is lost in the event that the connection to the network 150 is disrupted while streaming.

The broadcast management server 120 receives 606 the set of captured videos of the event. In one embodiment, the broadcast management server 120 pre-processes 608 the received video files. Pre-processing may include preparing the video for further processing, for example, converting video files to a uniform file format, compressing the file in a particular format, adjusting the frame rate, resolution, color space, and the like. If the videos are received as a set of complete video files instead of a real-time stream, pre-processing 608 may also include time-synchronizing the video files. This time-synchronizing step extracts timestamps and camera identification information from the video files and generates a sequence of video load instructions that tell the broadcast management server 120 in which stream window 501 to display each video file and when to begin playback of each video file. This time-synchronization process allows the video files to be played back with the same relative timing as when they were captured, even when the video files have different start and end times. An example of the time synchronization process is described in more detail below with respect to FIG. 7. In some embodiments where the broadcast management server 120 receives 608 the video streams in real-time, the pre-processing step can be omitted.

The broadcast management server 120 generates 610 the broadcast management user interface (e.g., the user interface 500 of FIG. 5) and provides the display to the broadcast management client 130. The broadcast management client 130 displays 618 the captured videos in a time-synchronized manner using the broadcast manager interface 500. During playback of the videos, a broadcast manager user can simultaneously view all the video streams, and at any given time, select one of the streams for broadcasting. Thus, the broadcast manager user can switch between the different cameras used to capture the event. The broadcast management client 130 processes 620 the broadcast decisions entered by the broadcast manager user (e.g., which video to broadcast at any given time). The broadcast management client 130 transmits the decisions to the broadcast management server 120.

The broadcast management server 120 receives 612 the broadcast decisions and generates 614 the broadcast based on the decisions. The broadcast management server 120 stores the broadcast management decisions to the broadcast map. The broadcast map stores all of the broadcast decisions in such a way that the broadcast can be completely recreated from the original video files by applying the broadcast map. For example, in one embodiment, the broadcast map includes an entry every time the broadcast manager user switches the selection of the video for broadcasting from the multiple stream windows 501. In one embodiment, for example, each entry in the broadcast map includes a timestamp indicating how far into the broadcast the selection occurred, and an identifier referencing which video was selected. In one embodiment, the broadcast management server 120 also stores voiceover audio together with the broadcast map for the broadcast so that the broadcast can be recreated at a later time.

In one embodiment, the broadcast map is formatted as a set of instructions that allow the broadcast management server 120 to recreate the broadcast at a later time. For example, in one embodiment, a broadcast timer starts at the beginning of the broadcast to track how much time has elapsed. After a time period $t_1$ has elapsed, the broadcast manager user selects stream window W1, which is playing a video file V1 and is at a frame F1 when the selection occurs. The broadcast management server 120 stores an instruction to the broadcast map indicating that at an elapsed time $t_1$ from the start of the broadcast, load a video file V1 beginning at frame F1. Additional broadcast map instructions may indicate, for example, at an elapsed time $t_2$ into the broadcast, load video file V2 beginning at frame F2; at elapsed time $t_3$, load video file V3 beginning at frame F3, and so on.

In an alternative embodiment, the broadcast management server 120 stores only the elapsed time into the broadcast and the video file identifier. In this embodiment, the beginning frame can be computed from the elapsed time into the broadcast and the capture start time stored with the video file. In other alternative embodiments, the broadcast management server 120 can store a time into the video file (e.g., 25 seconds into the video) instead of a frame number.

The broadcast map may also include other instructions associated with the broadcast. For example, at time T4 change the voiceover volume to a volume level L, etc. In general, each action made by the broadcast manager user while creating the broadcast is stored to the broadcast map in the form of an instruction that can later be used to completely recreate the broadcast from the raw video files.

In one embodiment, more than one broadcast can be created from the same set of raw video files. For example, different broadcast manager users can each create their own personal broadcast of an event from the same set of video files, or one broadcast manager user can create more than one broadcast. Each broadcast is stored as a separate broadcast map that specifies the transitions between video streams such that the broadcast can be completely recreated by applying the broadcast map to the raw video files. Beneficially, the broadcast management system 100 need not store a new video file for each broadcast that is created. Instead only the initial set of raw videos (e.g., unedited videos) are stored, and only a new broadcast map is stored for each created broadcast. This storage configuration is beneficial because the broadcast map would require far less storage space than a full video file. The broadcast map could be implemented, for example, as a small text file storing the set of broadcast decisions.

The viewer client 140 displays 622 the broadcast viewer interface. The viewer client 624 receives a selection of a broadcast for viewing and displays 626 the selected broadcast. In various embodiments, viewers can view "live" broadcasts streamed in real-time as they are created by the broadcast management system 100, or the user can view past broadcasts stored by the broadcast management system 100. A process for replaying a previously created broadcast is described below with respect to FIG. 8.

Figure 7:
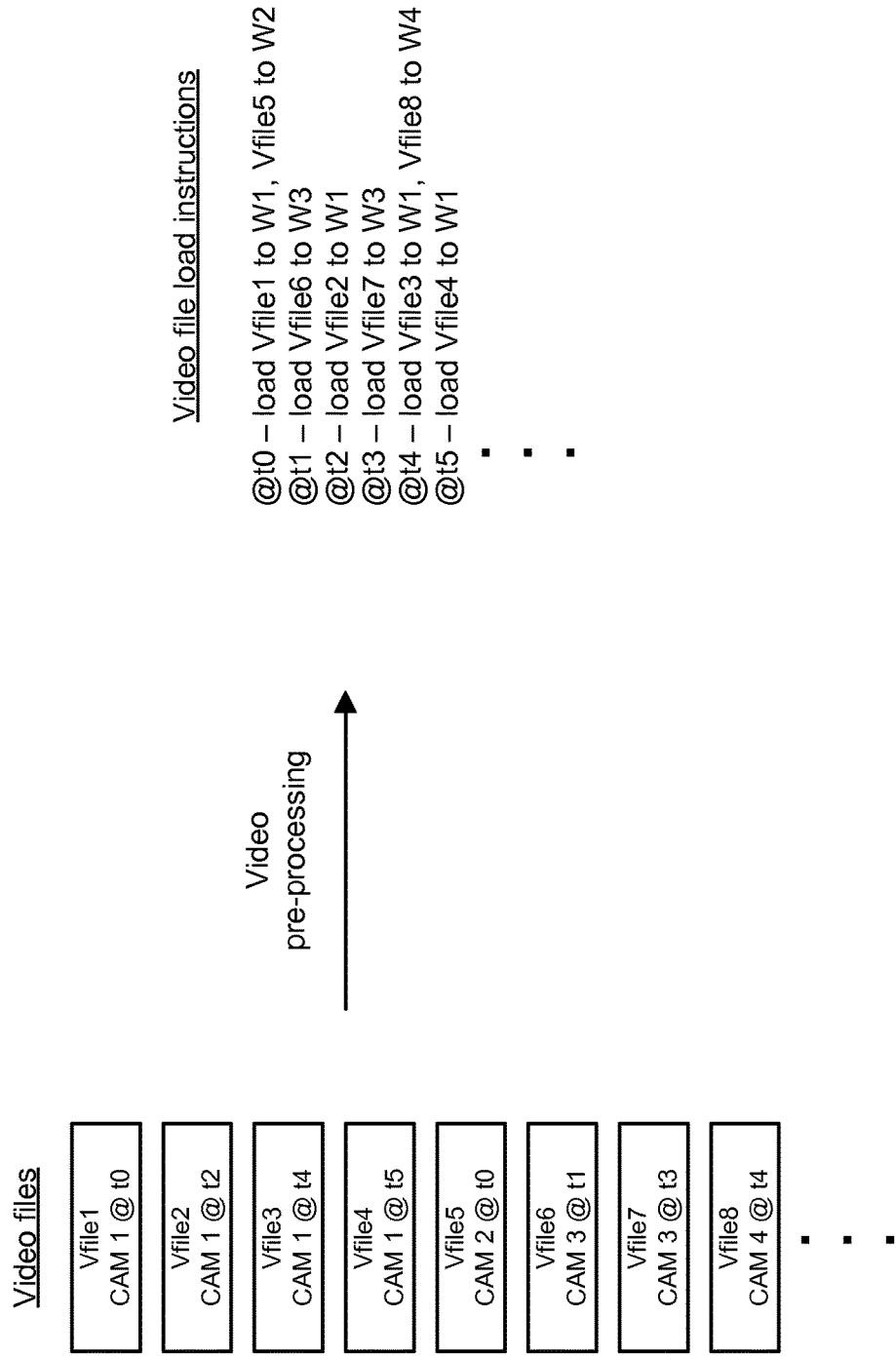
FIG. 7 illustrates an embodiment of a process for time-synchronizing video files in the broadcast management system.

FIG. 7 illustrates an example of a technique for preprocessing a set of video files so that they can be broadcasted in a time-synchronized manner. This technique can be applied when a broadcast manager user wants to create a broadcast from previously captured video files of an event. In this example, the broadcast management server 120 receives a set of video files from four different cameras (CAM 1, CAM 2, CAM 3, and CAM 4). Multiple video files can be received from a single camera. This occurs because cameras typically store a separate video file for each continuous stream of captured. For example, a camera may record video continuously for a first time period, stop recording for a second time period, and record continuously again for a third time period. The videos from the first and third time periods are typically stored as separate video files, while no data is stored during the second time period when the camera is not recording. In the example of FIG. 7, the broadcast management server 120 receives four different video files from CAM 1, one video file from CAM 2, two different video files from CAM 3, and one video file from CAM 4.

Each stored video file Vfile1-VfileN includes metadata indicating an identifier of the camera from which the video originated (e.g., CAM 1, CAM 2, CAM 3, CAM 4) and a timestamp indicating a capture start time when the video recording started (e.g., t0, t1, t2 . . . ) For example, video file Vfile1 was recorded on CAM 1 starting at a capture start time t0, Vfile2 was recorded on CAM1 starting at a capture start time t2, and so on. During pre-processing, the broadcast management server 120 extracts the metadata from the video files and generates a set of video file load instructions. These instructions indicates a replay start time when a particular video file should be loaded to the broadcast management user interface 500, and to which stream window 501 the video file should be loaded. For example, at a replay start time t0, the broadcast management server 120 begins playback of Vfile1 in stream window W1 and simultaneously begins playback of Vfile5 to stream window W2, at replay start time t1, the broadcast management server 120 begins playback of Vfile6 to stream window W3, and so on. Accordingly, the process enables synchronized display of the multiple video streams to allow a user to create a broadcast.

In one embodiment, the broadcast management server 120 displays a predefined default display in a stream window 501 when no video is currently playing. For example, in the example above, CAM 3 has no video footage between time t0 and t1. During this time, the broadcast management server 120 displays the default display in the stream window W3. Similarly, if there is a time gap between the end of a first video file and the start of a second video file, the broadcast management server 120 displays the default display in the appropriate stream window 501. In one embodiment, the default display screen simply comprises a black screen. In another embodiment, the default screen can include a message such as, for example, "No video available."

Figure 8:
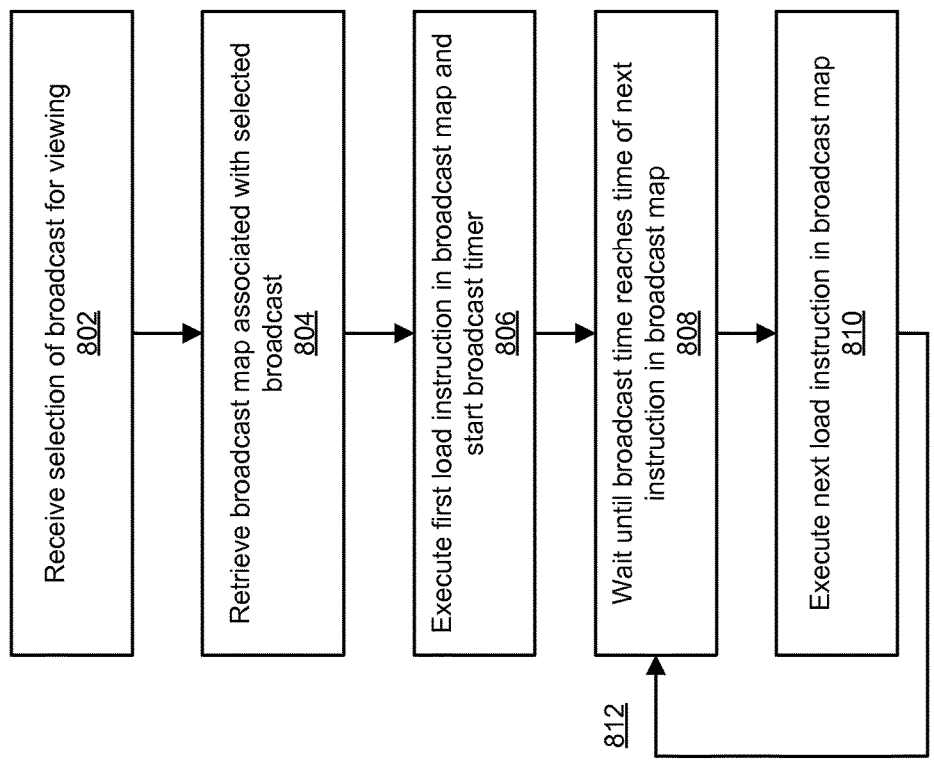
FIG. 8 is a flowchart illustrating an embodiment of a process for replaying a previously created broadcast using the broadcast management system.

FIG. 8 illustrates an embodiment of a process performed by the broadcast management server 120 for replaying a broadcast to a viewer client 140 that has previously been created and stored as a broadcast map. The broadcast management server 120 receives 802 a selection of a previously stored broadcast for viewing on a viewer client 140. The broadcast management server 120 retrieves the broadcast map associated with the selected broadcast from the broadcast map database 410. The broadcast management server 120 executes 806 the first instruction in the broadcast map. For example, the instruction may specify loading a particular video file beginning at a particular time point or frame number within the video file. The broadcast management server 120 also starts a timer to track the amount of time progressed into the broadcast. The broadcast management server 120 then waits 808 until the time that the next instruction in the broadcast map is reached and executes 810 the instruction. Steps 808, 810 then repeat 812 until the broadcast is complete.

FIG. 9 is a flowchart illustrating one embodiment of a process for operating the video capture system 110 according to one embodiment. In this example process, the video capture system 110 is configured to operate over a wireless data network 150 (e.g., a cellular network). The communications interface 308 can be turned on 902 (or off) with a button, for example, or it could be turned on automatically when the camera 302 is turned on. When the camera 302 and communications interface 308 are turned on, the communications interface 308 connects 904 to the network 150. The camera 302 begins recording 906. While recording, the camera 302 can either stream 910 the captured video to the broadcast management server 120 via the communications interface 308, store 910 the video locally to storage 306, or both. In one embodiment, the streamed and/or stored video data includes an indication of a specific broadcast management account to associate with the streamed data so that the user can later retrieve the files. The streamed and/or stored video data also includes an identifier identifying the camera 302 and a timestamp indicating the start time of the video recording.

When the user presses a "stop" button on the camera 302 to stop 912 recording, the video data in storage 306 is saved as a video file. Similarly, the broadcast management server 120 stores any streamed video data to a video file on the server 120. The saved video files are then accessible when the user logs in to his broadcast account on the broadcast management website.

If the communications interface 308 loses its connection to the data network 150, the camera 302 can buffer recorded video to storage 306 until the connection is re-established. Once re-established, the communications interface 308 transmits the buffered data to the broadcast management server 120. Alternatively, if no data network 150 is available, or if the user chooses not to live stream the data, the entire video can be stored to storage 306, and the user can later upload the files to the broadcast management server 120 using the communications interface 308 or via a web interface.

The described embodiments beneficially provide a broadcast management system 100 (and method) that allows a user to store or stream a plurality of videos of an event, and create a broadcast of the event from the videos. By using multiple video streams, the broadcast management system 100 can create broadcasts that include multiple camera views. Unlike professional broadcast systems, which are limited to managing live video feeds, one embodiment of the broadcast management system 100 allows a user to create a broadcast from previously recorded video files. By timestamping video files relative to a universal clock, the broadcast management system 100 can subsequently resynchronize the video files, and replay the videos concurrently to a broadcast management user interface 500 that allows a user to easily create a broadcast by selecting between videos as they are being replayed. Furthermore, unlike professional broadcast systems, an embodiment of the broadcast management system 100 provides a user-friendly web-based interface for managing and/or viewing broadcasts.

It is noted that terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a broadcast management system as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for broadcasting an event using a broadcast management system, the method comprising:
   receiving a first video associated with a first location of the event, the first video captured using a first handheld camera device;
   receiving a second video associated with one of the first location and a second location of the event, the second video captured using a second handheld camera device;
   extracting first metadata from the first video and second metadata from the second video, the first metadata including a first start time timestamp of the first video and a first identifier of the first handheld camera device, the second metadata including a second start time timestamp of the second video and a second identifier of the second handheld camera device;
   generating a first set of instructions using the first metadata and the second metadata;
   displaying, via an interface of the broadcast management system, the first video and the second video in a time-synchronized manner using the first set of instructions;
   generating a second set of instructions based on a selection of the first video from the interface at a first elapsed time timestamp and a selection of the second video from the interface at a second elapsed time timestamp, the second elapsed time timestamp being after the first elapsed time timestamp; and
   generating a broadcast map based on the second set of instructions, the broadcast map indicative of a transition to the first video at the first elapsed time timestamp and between the first video and the second video at the second elapsed time timestamp.

2. The method of claim 1, wherein a first universal clock of the first handheld camera device is configured to generate the first start time timestamp and a second universal clock of the second handheld camera device is configured to generate the second start time timestamp.

3. The method of claim 2, wherein the respective universal clocks are configured to maintain universal time using a time standard that is read by the respective handheld camera devices, the time standard being Coordinated Universal Time.

4. The method of claim 3, wherein the respective handheld camera devices are configured to re-synchronize the respective universal clocks to the time standard using an external clock at periodic intervals to compensate for drift between the respective universal clocks and the external clock, and wherein the periodic intervals occur when the respective handheld camera devices connect to one of a network or a web-enabled computing device.

5. The method of claim 4, wherein the external clock is one of a mobile phone tower clock, a GPS clock, or an atomic clock.

6. The method of claim 1, wherein displaying, via an interface of the broadcast management system, the first video and the second video in a time-synchronized manner using the first set of instructions comprises:
   displaying the first video to an operator via a first stream window of the interface in accordance with the first set of instructions, the first stream window being associated with the first identifier; and
   displaying the second video to the operator via a second stream window of the interface in accordance with the first set of instructions, the second stream window being associated with the second identifier.

7. The method of claim 6, comprising:
   receiving the selection of the first video via the first stream window from the operator, the first selection including a first duration;
   receiving the selection of the second video via the second stream window from the operator, the second selection including a second duration;
   generating the broadcast map using the first duration and the second duration; and
   storing the broadcast map in a database of the broadcast management system.

8. The method of claim 7, further comprising:
   broadcasting the event to a plurality of users via the broadcast management system using the broadcast map.

9. The method of claim 7, further comprising:
   storing first user information associated with a first user of the first handheld camera device in the database; and
   storing second user information associated with a second user of the second handheld camera device in the database.

10. The method of claim 9, wherein the first user information includes information related to a first user profile associated with the first user, information related to videos previously uploaded by the first user, and information related to broadcasts created by the first user, further wherein the second user information includes information related to a second user profile associated with the second user, information related to videos previously uploaded by the second user, and information related to broadcasts created by the second user.

11. The method of claim 1, wherein the first handheld camera device is configured to operate over a cellular network and the second handheld camera device is configured to operate over a cellular network.

12. A broadcast management system for broadcasting an event, the system comprising:
   an interface;
   a non-transient memory; and
   a processor configured to execute instructions stored in the non-transient memory to:
      receive a first video associated with a first location of the event, the first video captured using a first video capture system;
      receive a second video associated with a second location of the event, the second video captured using a second video capture system;
      extract first metadata from the first video and second metadata from the second video, the first metadata including a first start time timestamp of the first video and a first identifier of the first video capture system, and the second metadata including a second start time timestamp of the second video and a second identifier of the second video capture system;
      generate a first set of instructions using the first metadata and the second metadata, the first set of instructions identifying first and second stream windows within the interface for display of the first video and the second video, respectively, a first time to begin playback of the first video in the first stream window, and a second time to begin playback of the second video in the second stream window, the first time and the second time being based on the first start time timestamp and the second start time timestamp, respectively; and display, via the interface of the broadcast management system, the first video and the second video within the first stream window and the second stream window in a time-synchronized manner in respect to a universal time using the first set of instructions.

13. The system of claim 12, wherein a first universal clock of the first video capture system is configured to generate the first start time timestamp and a second universal clock of the second video capture system is configured to generate the second start time timestamp.

14. The system of claim 13, wherein the respective universal clocks are configured to maintain universal time using a time standard that is read by the respective video capture systems, the time standard being Coordinated Universal Time.

15. The system of claim 14, wherein the respective video capture systems are configured to re-synchronize the respective universal clocks to the time standard using an external clock at periodic intervals to compensate for drift between the respective universal clocks and the external clock, and wherein the periodic intervals occur when the respective video capture systems connect to one of a network or a web-enabled computing device.

16. The system of claim 12, wherein the processor is further configured to execute instructions stored in the non-transient memory to:
receive at least one selection of at least one of the first video and the second video via at least one of the first stream window and the second stream window from the operator, each selection of the at least one selection including a corresponding duration;
generate a broadcast map using the at least one selection, the broadcast map including a second set of instructions indicative of a transition between the first video and the second video;
store the broadcast map in a database of the broadcast management system; and
broadcast the event to a plurality of users via the broadcast management system using the broadcast map.

17. The system of claim 16, wherein the processor is further configured to execute instructions stored in the non-transient memory to:
store first user information associated with a first user of the first video capture system in the database and second user information associated with a second user of the second video capture system in the database.

18. The system of claim 12, wherein the first video capture system comprises a first handheld camera device coupled to a first cellular-enabled device and the second video capture system comprises a second handheld camera device coupled to a second cellular-enabled device.

19. A non-transitory computer-readable storage medium for broadcasting an event using a broadcast management system, wherein the non-transitory computer-readable storage medium includes executable instructions that, when executed by a processor, facilitate performance of operations, the operations comprising:
receiving a first video associated with a first location of the event, the first video captured using a first consumer grade camera;
receiving a second video associated with one of the first location and a second location of the event, the second video captured using a second consumer grade camera;
extracting first metadata from the first video and second metadata from the second video, the first metadata including a first start time timestamp of the first video and a first identifier of the first consumer grade camera, the first start time timestamp being generated via a first universal clock of the first consumer grade camera, the second metadata including a second start time timestamp of the second video and a second identifier of the second consumer grade camera, the second start time timestamp being generated via a second universal clock of the second consumer grade camera; and
displaying, via an interface of the broadcast management system, the first video and the second video in a time-synchronized manner by displaying the first video in a first stream window of the interface at a first time based on the first start time timestamp and displaying the second video in a second stream window of the interface at a second time based on the second start time timestamp, the second time being after the first time with respect to a universal time.

20. The non-transitory computer-readable storage medium of claim 19, the operations comprising:
generating a broadcast map based on a selection of the first video from the first stream window at a first elapsed time timestamp and a selection of the second video from the second stream window at a second elapsed time timestamp, the broadcast map indicative of a transition to the first video during a broadcast at the first elapsed time timestamp and between the first video and the second video during the broadcast at the second elapsed time timestamp.

* * * * *